United States Patent
Weissman

(10) Patent No.: US 6,868,254 B2
(45) Date of Patent: Mar. 15, 2005

(54) REPEATER WITH DIVERSITY TRANSMISSION

(75) Inventor: Haim Weissman, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 567 days.

(21) Appl. No.: 09/943,887

(22) Filed: Aug. 30, 2001

(65) Prior Publication Data

US 2003/0045230 A1 Mar. 6, 2003

(51) Int. Cl.$^7$ ................................................ H04B 7/15
(52) U.S. Cl. ..................... 455/11.1; 455/445; 455/16; 455/25
(58) Field of Search ............................... 455/11.1, 445, 455/18, 24, 25, 23, 19, 16, 13.3, 17, 447, 446, 9, 562.1

(56) References Cited

U.S. PATENT DOCUMENTS

| | | | |
|---|---|---|---|
| 4,041,389 A | | 8/1977 | Oades ........................... 325/3 |
| 4,704,733 A | * | 11/1987 | Kawano ....................... 455/16 |
| 4,727,590 A | * | 2/1988 | Kawano et al. .............. 455/446 |
| 5,179,720 A | * | 1/1993 | Grube et al. .................. 455/16 |
| 6,088,592 A | * | 7/2000 | Doner et al. ................ 455/447 |
| 6,731,904 B1 | * | 5/2004 | Judd ......................... 455/11.1 |

* cited by examiner

*Primary Examiner*—Nay Maung
*Assistant Examiner*—John J. Lee
(74) *Attorney, Agent, or Firm*—Philip Wadsworth; Bruce W. Greenhaus; Donald C. Kordich

(57) ABSTRACT

A radio-frequency (RF) repeater, including a first repeating section which is adapted to receive and amplify forward-signals from a first transceiver so as to generate amplified-forward-signals and to radiate the amplified-forward-signals to a second transceiver. The first section also receives and amplifies reverse-main-signals from the second transceiver so as to generate amplified-reverse-main-signals and transmits the amplified-reverse-main-signals to the first transceiver. The repeater includes a second repeating section which is adapted to receive and amplify reverse-diversity-signals from the second transceiver so as to generate amplified-reverse-diversity-signals and transmits the amplified-reverse-diversity-signals to the first transceiver.

42 Claims, 5 Drawing Sheets

REPEATER WITH DIVERSITY TRANSMISSION

FIELD OF THE INVENTION

The present invention relates generally to transmission of electromagnetic signals, and specifically to automatic amplification and retransmission of the signals.

BACKGROUND OF THE INVENTION

Electronic repeaters, wherein a received electromagnetic signal is automatically amplified and then retransmitted, are well known in the art. Use of a repeater enables a relatively low-power original signal, such as that from a mobile telephone unit, to be transmitted with a power orders of magnitude greater than the original signal.

FIG. 1 illustrates a repeater system 10, as is known in the art. A first antenna 12 receives a signal from a first transmitter 13, for example a cellular base-station transceiver system (BTS). The signal is transferred on a coaxial cable 14 to a repeater 16, wherein the signal is amplified and transferred on a coaxial cable 18 to a second antenna 19, which transmits the "repeated" signal generated by repeater 16. Similarly, a signal received by antenna 19 from a second transmitter 15, such as a mobile telephone, traverses a reverse path through system 10, being amplified in repeater 16 and retransmitted by antenna 12. Overall power gains typically required for the signals, from antenna to antenna, are of the order of 90 dB.

Repeaters which separate the functions performed by repeater 16 into two or more separate systems are also known in the art. U.S. Pat. No. 5,404,570, to Charas et al, which is incorporated herein by reference, describes a repeater system used between a base-station transceiver system (BTS) and a closed environment, such as a tunnel, which is closed off to transmissions from the BTS. The system down-converts a high radio-frequency (RF) signal from the BTS to an intermediate frequency (IF) signal, which is then radiated by a cable and an antenna in the closed environment to a receiver therein. The receiver up-converts the IF signal to the original RF signal. Systems described in the patent serve a vehicle moving in a tunnel, so that passengers in the vehicle who would otherwise be cut off from the BTS are able to receive signals.

U.S. Pat. No. 5,603,080, to Kallandar et al., which is incorporated herein by reference, describes a plurality of repeater systems used between a plurality of BTSs and a closed environment, which is closed off to transmissions from the BTSs. Each repeater system down-converts an RF signal from its respective BTS to an IF signal, which is then transferred by a cable in the closed environment to one or more respective receivers therein. Each receiver up-converts the IF signal to the original RF signal. Systems described by the inventors serve a vehicle moving between overlapping regions in a tunnel, each region covered by one of the BTSs via its repeater system.

U.S. Pat. No. 5,765,099, to Georges et al., which is incorporated herein by reference, describes a system and method for transferring an RF signal between two or more regions using a low-bandwidth medium such as twisted-pair cabling. In a first region the RF signal is mixed with a first local oscillator to produce a down-converted IF signal. The IF signal is transferred to a second region via the low-bandwidth medium, wherein the signal is up-converted to the original RF signal using a second local oscillator. The local oscillators are each locked by a phase locked loop (PLL) in each region to generate the same frequency, the locking being performed in each loop by comparing the local oscillator frequency with a single low-frequency stable reference signal generated in one region. The reference signal is transferred between the regions via the low-bandwidth medium.

Cellular communications receivers typically suffer from large variations in received signal power, due to phenomena such as Rayleigh and Ricean fading. The effects of the large variations are exacerbated as a mobile transceiver within the system changes position. A method well-known in the cellular communications art for alleviating the problems is to receive a plurality of signals from the transceiver, typically two signals herein termed main and diversity signals. The two signals are processed in order to enhance the reception from the mobile transceiver. The main and diversity signals are typically received from two respective antennas which in turn receive an initial signal transmitted by the mobile. The antennas may be spatially separated, and/or may receive different polarizations, and/or may have differing time delays introduced into their respective reception paths, generating spatial, polarization, and temporal diversity respectively.

SUMMARY OF THE INVENTION

It is an object of some aspects of the present invention to provide an improved method and apparatus for repeating of electromagnetic signals.

In some preferred embodiments of the present invention, a repeater system comprises elements housed within a single unit, at least some of the elements repeating forward signals transmitted from a base-station transceiver system (BTS) to a mobile transceiver. Some of the elements conveying the forward transmission signals are also utilized within the single unit for repeating main reverse signals transmitted from the mobile to the BTS. Other elements within the unit repeat diversity reverse signals transmitted from the mobile. Mobiles utilizing the repeater system are typically positioned in a region which is "hidden" from the BTS, so that signals do not transfer directly between the BTS and the mobile. Thus, forward signals and both main and diversity reverse signals can be transferred between the mobile and the BTS, when the mobile is hidden from the BTS, using a single unit.

In some preferred embodiments of the present invention, the repeater system comprises two separate repeater units which together operate substantially as described above. One of the units communicates with the BTS, and the other unit communicates with the mobile. The separate units are coupled by cabling which transfers signals between the units. Implementing the repeater system as coupled units allows each of the units to be positioned relatively independently, increasing the flexibility of use of the repeater system.

In some preferred embodiments comprising two separate repeater units, frequency conversion is performed within the separate units. The converted frequencies are preferably intermediate frequencies having a substantially lower frequency than initial signals broadcast by the BTS and the mobile. The intermediate frequencies are transferred by cabling which comprises cables adapted to transfer electric signals, and the initial signals, comprising forward, reverse-main and reverse-diversity signals, are recovered after the transfer. Alternatively, at least some of the frequency conversion is implemented by modulating an optical carrier with one or more of the initial signals. Thus, the converted frequencies comprise optical radiation, and the cabling comprises a fiber optic guide. Implementing frequency conversion in the separate units reduces losses generated within the cabling coupling the units, so that the units may be separated by significantly larger distances compared to units where there is no frequency conversion. Separation of the units also enables output radio-frequency (RF) units to be positioned close to their respective antennas, so reducing the required output from each RF output unit.

In some of the preferred embodiments implementing frequency conversion with intermediate frequencies, one of the separate repeater units generates a local oscillator (LO) signal for performing the conversion. Most preferably, the LO signal, or a reference from which the LO signal can be generated, is transmitted via the cabling to the other repeater unit, where it is used to recover initial signals. In some of the preferred embodiments implementing frequency conversion by modulating an optical carrier, one of the separate repeater units generates the optical carrier, and the carrier is transmitted via the cabling to the other repeater unit, where it is used to recover the initial signals.

In some preferred embodiments comprising separate repeater units, a power supply located in or near one of the separate units produces an AC and/or a DC voltage to power the unit. The AC/DC voltage is transferred via the cabling to the other unit, in order to power the other unit. Furthermore, one of the separate repeater units preferably comprises a remote control unit, whereby control and monitoring of either or both repeater units may be performed by an operator remote from one or both of the units. Most preferably, the remote control unit operates by transmitting signals between the units and the remote operator via the cabling.

There is therefore provided, according to a preferred embodiment of the present invention, a radio-frequency (RF) repeater, including:

a first repeating section, which is adapted to receive and amplify forward-signals from a first transceiver so as to generate amplified-forward-signals and to radiate the amplified-forward-signals to a second transceiver, and to receive and amplify reverse-main-signals from the second transceiver so as to generate amplified-reverse-main-signals and to transmit the amplified-reverse-main-signals to the first transceiver; and a second repeating section, which is adapted to receive and amplify reverse-diversity-signals from the second transceiver so as to generate amplified-reverse-diversity-signals and to transmit the amplified-reverse-diversity-signals to the first transceiver.

Preferably, the repeater includes a housing which contains the first and second repeating sections.

Preferably, the forward-signals are not received by the second transceiver, and the reverse-main-signals and the reverse-diversity-signals are not received by the first transceiver.

Further preferably, the reverse-main-signals and the reverse-diversity-signals are generated from a reverse-signal transmitted from the second transceiver.

Preferably, the first repeating section includes a first antenna which receives the reverse-main-signals, and the second repeating section includes a second antenna which receives the reverse-diversity-signals.

Further preferably, the first and second antennas are separated by a distance within a range of 1–6 wavelengths of the reverse-main-signals and the reverse-diversity-signals.

Alternatively or additionally, the first and second antennas are adapted to receive differently polarized signals.

Preferably, the first and the second repeating sections are adapted to introduce a time differential between the reverse-main-signals and the reverse-diversity-signals.

There is further provided, according to a preferred embodiment of the present invention, a radio-frequency (RF) repeater system, including:

a first repeater unit, which is adapted to receive and amplify forward-signals from a first transceiver so as to generate amplified-forward-signals;

cabling, which is adapted to receive and convey the amplified-forward-signals from the first repeater unit; and a second repeater unit, which is adapted to receive the amplified-forward-signals from the cabling and to further amplify the amplified-forward-signals so as to generate resultant-forward-signals and to radiate the resultant-forward-signals to a second transceiver, and which is adapted to receive and amplify reverse-main-signals and reverse-diversity-signals from the second transceiver so as to generate respectively amplified-reverse-main-signals and amplified-reverse-diversity-signals and to convey the amplified-reverse-main-signals and the amplified-reverse-diversity-signals to the first repeater unit via the cabling, and wherein the first repeater unit is adapted to further amplify the amplified-reverse-main-signals and amplified-reverse-diversity-signals so as to generate respective resultant-reverse-main-signals and resultant-reverse-diversity-signals and to transmit the resultant-reverse-main-signals and the resultant-reverse-diversity-signals to the first transceiver.

Preferably, the forward-signals are not received by the second transceiver, and the reverse-main-signals and the reverse-diversity-signals are not received by the first transceiver.

Preferably, the reverse-main-signals and the reverse-diversity-signals are generated from a reverse-signal transmitted from the second transceiver.

Preferably, the second repeater unit includes a first antenna which receives the reverse-main-signals and a second antenna which receives the reverse-diversity-signals.

Preferably, the first and second antennas are separated by a distance within a range of 1–6 wavelengths of the reverse-main-signals and the reverse-diversity-signals.

Alternatively or additionally, the first and second antennas are adapted to receive differently polarized signals.

Preferably, at least one of the first and the second repeater units is adapted to introduce a time differential between the reverse-main-signals and the reverse-diversity-signals.

Preferably, the cabling includes a first cable which conveys the amplified-forward-signals and the amplified-reverse-main-signals, and a second cable which conveys the amplified-reverse-diversity-signals.

Preferably, the first repeater unit includes a power supply which supplies power to the first repeater unit and to the second repeater unit via the cabling.

Preferably, the first repeater unit includes a monitor which monitors a condition of the first repeater unit and of the second repeater unit via the cabling.

Further preferably, the first repeater unit includes a first forward-signal-converter adapted to generate the amplified-forward-signals as converted-frequency-forward-signals, and the second repeater unit includes a second forward-signal-converter adapted to generate the resultant-forward-signals from the converted-frequency-forward-signals.

Preferably, the first forward-signal-converter includes a first mixer which receives an indication of a local oscillator (LO) frequency and generates the converted-frequency-forward-signals as intermediate-frequency-forward-signals (IF-forward-signals) having a frequency less than the forward-signals responsive to the indication, and the second forward-signal-converter includes a second mixer which receives the indication of the LO frequency and the IF-forward-signals and generates the resultant-forward-signals responsive thereto.

Preferably, the first forward-signal-converter includes an optical emitter which generates a modulated-optical-carrier responsive to the forward-signals, the second forward-signal-converter includes an optical detector which receives the modulated-optical-carrier and generates the resultant-forward-signals therefrom, and the cabling includes a fiber optic cable.

Preferably, the second repeater unit includes:

a first reverse-signal-converter adapted to generate the amplified-reverse-main-signals as converted-frequency-reverse-main-signals; and a second reverse-signal-converter adapted to generate the amplified-reverse-diversity-signals as converted-frequency-reverse-diversity-signals, and, preferably, the first repeater unit includes:

a third reverse-signal-converter adapted to generate the resultant-reverse-main-signals from the converted-frequency-reverse-main-signals; and a fourth reverse-signal-converter adapted to generate the resultant-reverse-diversity-signals from the converted-frequency-reverse-diversity-signals.

Further preferably, the converted-frequency-reverse-diversity-signals have a different frequency from the converted-frequency-reverse-main-signals.

Preferably, the first reverse-signal-converter includes a first mixer which receives an indication of a first local oscillator (LO) frequency and generates the converted-frequency-reverse-main-signals as intermediate-frequency-reverse-main-signals (IF-reverse-main-signals) having a frequency less than the reverse-main-signals responsive thereto, and the third reverse-signal-converter includes a second mixer which receives the indication of the first LO frequency and the IF-reverse-main-signals and generates the resultant-reverse-main-signals responsive thereto.

Preferably, the second reverse-signal-converter includes a third mixer which receives an indication of a second LO frequency and generates the converted-frequency-reverse-diversity-signals as intermediate-frequency-reverse-diversity-signals (IF-reverse-diversity-signals) having a frequency less than the reverse-diversity-signals responsive thereto, and the fourth reverse-signal-converter includes a fourth mixer which receives the indication of the second LO frequency and the IF-reverse-diversity-signals and generates the resultant-reverse-diversity-signals responsive thereto.

Further preferably, the second LO frequency and the first LO frequency are different.

Preferably, the first reverse-signal-converter includes a first optical emitter which generates a first modulated-optical-carrier responsive to the reverse-main-signals, and the third reverse-signal-converter includes a first optical detector which receives the first modulated-optical-carrier and generates the resultant-reverse-main-signals therefrom, and the cabling includes a fiber optic cable.

Preferably, the second reverse-signal-converter includes a second optical emitter which generates a second modulated-optical-carrier responsive to the reverse-diversity-signals, and the fourth reverse-signal-converter includes a second optical detector which receives the second modulated-optical-carrier and generates the resultant-reverse-diversity-signals therefrom.

Preferably, the second modulated-optical-carrier has a second modulated-optical-carrier frequency different in value from a first modulated-optical-carrier frequency of the first modulated-optical-carrier.

There is further provided, according to a preferred embodiment of the present invention, a method for repeating radio-frequency (RF) signals, including:

receiving in a first repeating section forward-signals from a first transceiver;

amplifying the forward-signals in the first repeating section so as to generate amplified-forward-signals;

radiating the amplified-forward-signals from the first repeating section to a second transceiver;

receiving in the first repeating section reverse-main-signals from the second transceiver;

amplifying the reverse-main-signals in the first repeating section so as to generate amplified-reverse-main-signals;

transmitting the amplified-reverse-main-signals from the first repeating section to the first transceiver;

receiving in a second repeating section reverse-diversity-signals from the second transceiver;

amplifying the reverse-diversity-signals in the second repeating section so as to generate amplified-reverse-diversity-signals; and transmitting the amplified-reverse-diversity-signals from the second repeating section to the first transceiver.

Preferably, the method includes enclosing the first and the second repeating sections in a common housing.

Preferably, the forward-signals are not received by the second transceiver, and the reverse-main-signals and the reverse-diversity-signals are not received by the first transceiver.

Preferably, the method includes transmitting a reverse-signal from the second transceiver, and receiving in the first repeating section the reverse-main-signals includes generating the reverse-main-signals responsive to the reverse-signal, and receiving in the second repeating section the reverse-diversity-signals includes generating the reverse-diversity-signals responsive to the reverse-signal.

Further preferably, the method includes receiving the reverse-main-signals in a first antenna included in the first repeating section, and receiving the reverse-diversity-signals in a second antenna included in the second repeating section.

Preferably, the first and second antennas are separated by a distance within a range of 1–6 wavelengths of the reverse-main-signals and the reverse-diversity-signals.

Alternatively or additionally, the first and second antennas are adapted to receive differently polarized signals.

Preferably, the method includes introducing a time delay between the reverse-main-signals and the reverse-diversity-signals.

There is further provided, according to a preferred embodiment of the present invention, a method for repeating radio-frequency (RF) signals, including:

receiving forward-signals from a first transceiver;

amplifying the forward-signals in a first repeater unit so as to generate amplified-forward-signals;

conveying the amplified-forward-signals to a second repeater unit;

further amplifying the amplified-forward-signals in the second repeater unit so as to generate resultant-forward-signals;

radiating the resultant-forward-signals to a second transceiver;

receiving reverse-main-signals and reverse-diversity-signals from the second transceiver;

amplifying the reverse-main-signals and the reverse-diversity-signals in the second repeater unit so as to generate respectively amplified-reverse-main-signals and amplified-reverse-diversity-signals;

conveying the amplified-reverse-main-signals and the amplified-reverse-diversity-signals to the first repeater unit;

further amplifying the amplified-reverse-main-signals and amplified-reverse-diversity-signals in the first repeater unit so as to generate respectively resultant-reverse-main-signals and resultant-reverse-diversity-signals; and transmitting the resultant-reverse-main-signals and the resultant-reverse-diversity-signals to the first transceiver.

Preferably, conveying the amplified-forward-signals includes conveying the amplified-forward-signals via cabling.

Preferably, the forward-signals are not received by the second transceiver, and the reverse-main-signals and the reverse-diversity-signals are not received by the first transceiver.

Preferably, receiving the reverse-main-signals and the reverse-diversity-signals from the second transceiver includes transmitting a reverse-signal from the second transceiver and generating the reverse-main-signals and the reverse-diversity-signals responsive to the reverse-signal.

Preferably, receiving the reverse-main-signals and the reverse-diversity-signals includes receiving the reverse-main-signals in a first antenna and receiving the reverse-diversity-signals in a second antenna.

Preferably, the first and second antennas are separated by a distance within a range of 1–6 wavelengths of the reverse-main-signals and the reverse-diversity-signals.

Further preferably, the first and second antennas are adapted to receive differently polarized signals.

Preferably, the method includes introducing a time delay between the reverse-main-signals and the reverse-diversity-signals.

Preferably, conveying the amplified-forward-signals includes conveying the amplified-forward-signals via a first cable, and receiving the reverse-main-signals and the reverse-diversity-signals includes conveying the reverse-main-signals via the first cable and conveying the reverse-diversity-signals via a second cable.

Preferably, amplifying the forward-signals includes converting a frequency of the forward-signals to generate the amplified-forward-signals as converted-frequency-forward-signals, and further amplifying the amplified-forward-signals includes generating the resultant-forward-signals from the converted-frequency-forward-signals.

Preferably, converting the frequency of the forward-signals includes mixing the forward-signals in a first mixer with a local oscillator (LO) frequency and generating the converted-frequency-forward-signals as intermediate-frequency-forward-signals (IF-forward-signals) having a frequency less than the forward-signals, and further amplifying the amplified-forward-signals includes mixing the IF-forward-signals with the LO frequency and the IF-forward-signals in a second mixer and generating the resultant-forward-signals therefrom.

Preferably, converting the frequency of the forward-signals includes modulating an optical carrier to generate a modulated-optical-carrier responsive to the forward-signals, and conveying the modulated-optical-carrier from the first repeater unit to the second repeater unit via a fiber optic cable, and generating the resultant-forward-signals includes detecting the modulated-optical-carrier.

Preferably, the method includes:

generating in a first reverse-signal-converter comprised in the second repeater unit the amplified-reverse-main-signals as converted-frequency-reverse-main-signals;

generating in a second reverse-signal-converter comprised in the second repeater unit the amplified-reverse-diversity-signals as converted-frequency-reverse-diversity-signals;

generating in a third reverse-signal-converter comprised in the first repeater unit the resultant-reverse-main-signals from the converted-frequency-reverse-main-signals; and generating in a fourth reverse-signal-converter comprised in the first repeater unit the resultant-reverse-diversity-signals from the converted-frequency-reverse-diversity-signals.

Preferably, the converted-frequency-reverse-diversity-signals have a different frequency from the converted-frequency-reverse-main-signals.

Preferably, generating in the first reverse-signal-converter includes mixing a first local oscillator (LO) frequency with the reverse-main-signals so as to generate the converted-frequency-reverse-main-signals as intermediate-frequency-reverse-main-signals (IF-reverse-main-signals) having a frequency less than the reverse-main-signals, and generating in the third reverse-signal-converter includes mixing the first LO frequency and the IF-reverse-main-signals so as to generate the resultant-reverse-main-signals therefrom.

Preferably, generating in the second reverse-signal-converter includes mixing a second LO frequency different from the first LO frequency with the reverse-diversity-signals so as to generate the converted-frequency-reverse-diversity-signals as intermediate-frequency-reverse-diversity-signals (IF-reverse-diversity-signals) having a frequency less than the reverse-diversity-signals, and generating in the fourth reverse-signal-converter includes mixing the second LO frequency and the IF-reverse-diversity-signals so as to generate the resultant-reverse-diversity-signals therefrom.

Preferably, generating in the first reverse-signal-converter includes modulating a first optical emitter with the reverse-main-signals so as to produce a first modulated-optical-carrier and conveying the first modulated-optical-carrier from the second repeater unit to the first repeater unit via a fiber optic cable, and generating in the third reverse-signal-converter includes detecting the first modulated-optical-carrier and generating the resultant-reverse-main-signals therefrom.

Preferably, generating in the second reverse-signal-converter includes modulating a second optical emitter with the reverse-diversity-signals so as to produce a second modulated-optical-carrier, and conveying the first modulated-optical-carrier from the second repeater unit to the first repeater unit via the fiber optic cable, and generating in the fourth reverse-signal-converter includes detecting in a second optical detector the second modulated-optical-carrier and generating the resultant-reverse-diversity-signals therefrom.

There is further provided, according to a preferred embodiment of the present invention, a radio-frequency (RF) repeater system, including:

a first repeater unit, which is adapted to receive and amplify forward-signals from a first transceiver so as to generate amplified-forward-signals;

cabling, which is adapted to receive and convey the amplified-forward-signals from the first repeater unit; and a plurality of second repeater units, each of which is adapted to receive the amplified-forward-signals from the cabling and to further amplify the amplified-forward-signals so as to generate resultant-forward-signals and to radiate the resultant-forward-signals to a second transceiver, and which is adapted to receive and amplify reverse-main-signals and reverse-diversity-signals from the second transceiver so as to generate respectively amplified-reverse-main-signals and amplified-reverse-diversity-signals and to convey the amplified-reverse-main-signals and the amplified-reverse-diversity-signals to the first repeater unit via the cabling, and wherein the first repeater unit is adapted to further amplify the amplified-reverse-main-signals and amplified-reverse-diversity-signals so as to generate respective resultant-reverse-main-signals and resultant-reverse-diversity-signals and to transmit the resultant-reverse-main-signals and the resultant-reverse-diversity-signals to the first transceiver.

There is further provided, according to a preferred embodiment of the present invention, a method for repeating radio-frequency (RF) signals, including:

receiving forward-signals from a first transceiver;

amplifying the forward-signals in a first repeater unit so as to generate amplified-forward-signals;

conveying the amplified-forward-signals to a plurality of second repeater units;

further amplifying the amplified-forward-signals in the plurality of second repeater units so as to generate resultant-forward-signals;

radiating the resultant-forward-signals to a second transceiver;

receiving reverse-main-signals and reverse-diversity-signals from the second transceiver;

amplifying the reverse-main-signals and the reverse-diversity-signals in the plurality of second repeater units so as to generate respectively amplified-reverse-main-signals and amplified-reverse-diversity-signals;

conveying the amplified-reverse-main-signals and the amplified-reverse-diversity-signals to the first repeater unit;

further amplifying the amplified-reverse-main-signals and amplified-reverse-diversity-signals in the first repeater unit so as to generate respectively resultant-reverse-main-signals and resultant-reverse-diversity-signals; and transmitting the resultant-reverse-main-signals and the resultant-reverse-diversity-signals to the first transceiver.

Preferably, conveying the amplified-forward-signals includes conveying the amplified-forward-signals via cabling.

The present invention will be more fully understood from the following detailed description of the preferred embodiments thereof, taken together with the drawings, in which:

DETAILED DESCRIPTION OF PREFERRED EMBODIMENTS

Figure 1:
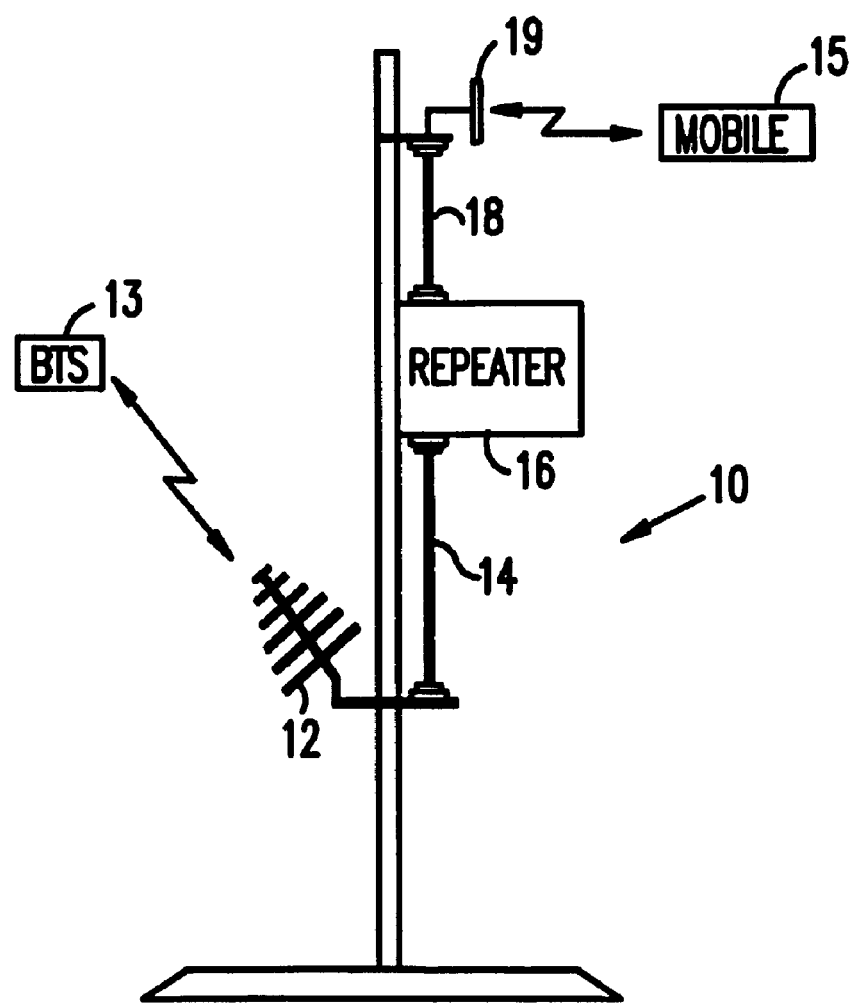
FIG. 1 schematically illustrates a repeater system, as is known in the art.
Figure 2:
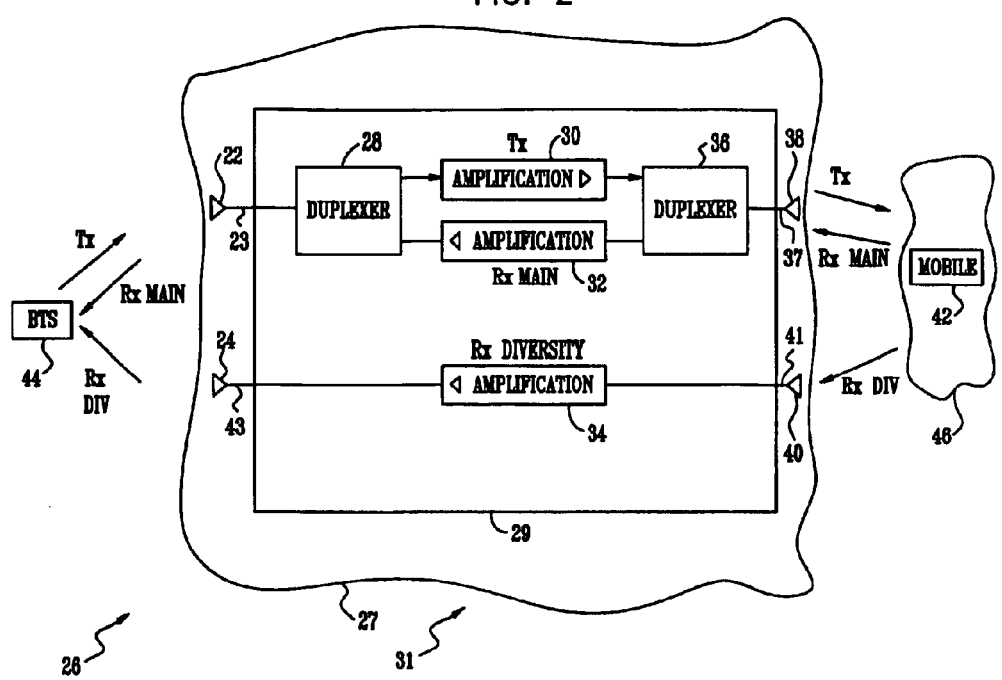
FIG. 2 schematically illustrates a combined main/diversity repeater, according to a preferred embodiment of the present invention.

Reference is now made to FIG. 2, which schematically illustrates a combined main/diversity repeater 26, according to a preferred embodiment of the present invention. Repeater 26 operates in a cellular communications network 31, and is implemented so as transfer signals between a region 27, wherein the repeater is located, and a region 46 remote from region 27. Repeater 26 is also implemented so as to transfer signals between itself and a base-station transceiver system (BTS) 44 remote from the repeater. Network 29 preferably operates according to a code division multiple access (CDMA) protocol, and in the description below network 29 is assumed, by way of example, to operate as a CDMA personal communication systems (PCS) network in a band from approximately 1850 MHz–1990 MHz. It will be understood, however, that the principles of the present invention apply to cellular communications networks operating under other protocols and/or in other frequency bands.

Repeater 26 comprises an antenna 22, which receives forward transmission (Tx) signals from BTS 44 in a frequency range from approximately 1930 MHz–1990 MHz. Antenna 22 transfers the Tx signals via a cable 23 to a duplexer 28, which filters the signals and passes them to an amplification section 30. Section 30 filters and amplifies the Tx signals, and the amplified Tx signals are then transferred from section 30 to a duplexer 36, which conveys the signals via a cable 37 to an antenna 38. Antenna 38 radiates the amplified Tx signals to region 46, wherein is located a mobile transceiver 42 which receives the signals. Duplexers 28 and 36 and section 30 comprise elements which are coupled together so as to receive and amplify signals within a bandwidth of up to 60 MHz centered on 1960 MHz and reject other signals, by methods and using components known in the art.

Repeater 26 receives main-reverse transmission (MAIN-Rx) signals from transceiver 42 at antenna 38, and diversity-reverse (DIV-Rx) signals at an antenna 40. The reverse signals are preferably in a frequency range of 1850 MHz–1910 MHz, if network 29 operates according to a USA PCS standard. Antennas 38 and 40 are implemented so that MAIN-Rx and DIV-Rx signals typically differ by one or more characteristics, and the signals are utilized by BTS 44 so as to improve reception of the signals, as is known in the art concerning the properties of main and diversity signals. Preferably, antennas 38 and 40 are separated spatially by approximately four wavelengths of the signal frequency, so that MAIN-Rx and DIV-Rx typically differ in amplitude when measured simultaneously. Alternatively or additionally, antennas 38 and 40 receive different polarizations, so that MAIN-Rx and DIV-Rx differ in polarization, and thus typically in amplitude. Further alternatively or additionally, a time delay is introduced in one of the paths in repeater 26 followed by the MAIN-Rx and DIV-Rx signals. Any method of differentiation of main and diversity signals, and/or combinations and subcombinations of these methods known in the art may be used, including the methods described above, and all such methods, combinations, and sub-combinations thereof are assumed to be comprised within the scope of the present invention.

MAIN-Rx signals from antenna 38 are transferred via cable 37 and duplexer 36 to an amplification section 32, and filtered amplified signals therefrom transfer to duplexer 28. The amplified MAIN-Rx signals are transmitted from antenna 22 to BTS 44. DIV-Rx signals from antenna 40 are transferred via a cable 41 to an amplification section 34, wherein the signals are filtered and amplified. The amplified DIV-Rx signals are transferred via a cable 43 to an antenna 24, which transmits the signals to BTS 44. BTS 44 thus receives the MAIN-Rx and DIV-Rx signals as main and diversity signals from mobile 42, and operates on the received signals according to methods known in the art. Elements of repeater 26, comprising components forming duplexers 28 and 26, and amplification sections 30, 32 and 34, are contained in a single housing 29. Preferably, housing 29 comprises other components, not shown for clarity, such as a power supply and a monitor for repeater 26, so that the repeater is able to function as a substantially stand-alone unit.

Repeater 26 is most preferably utilized in situations where region 27 is able to receive and transmit signals between region 27 and BTS 44, and also between region 27 and region 46, but where region 46 is substantially unable to receive and transmit to the BTS, so that region 46 and BTS 44 are "hidden" from each other. Utilizing repeater 26 in such a situation makes region 46 and BTS 44 "visible" to each other, with repeater 26 operating substantially transparently, and with the BTS being able to receive main and diversity signals from mobile transceiver 42 operating in region 46.

It will be understood that while repeater 26 transmits Rx-MAIN and Rx-DIV signals from antennas 22 and 24 to BTS 44 "over-the-air," and while repeater 26 receives Tx signals from BTS 44 over-the-air, other methods known in the art for transferring the signals between the BTS and the repeater may be used. For example, BTS 44 may be coupled to repeater 26 by one or more conductive and/or fiber optic cables which are capable of conveying the Tx, Rx-MAIN and Rx-DIV signals between the BTS and the repeater. All such methods are assumed to be comprised within the scope of the present invention.

Figure 3:
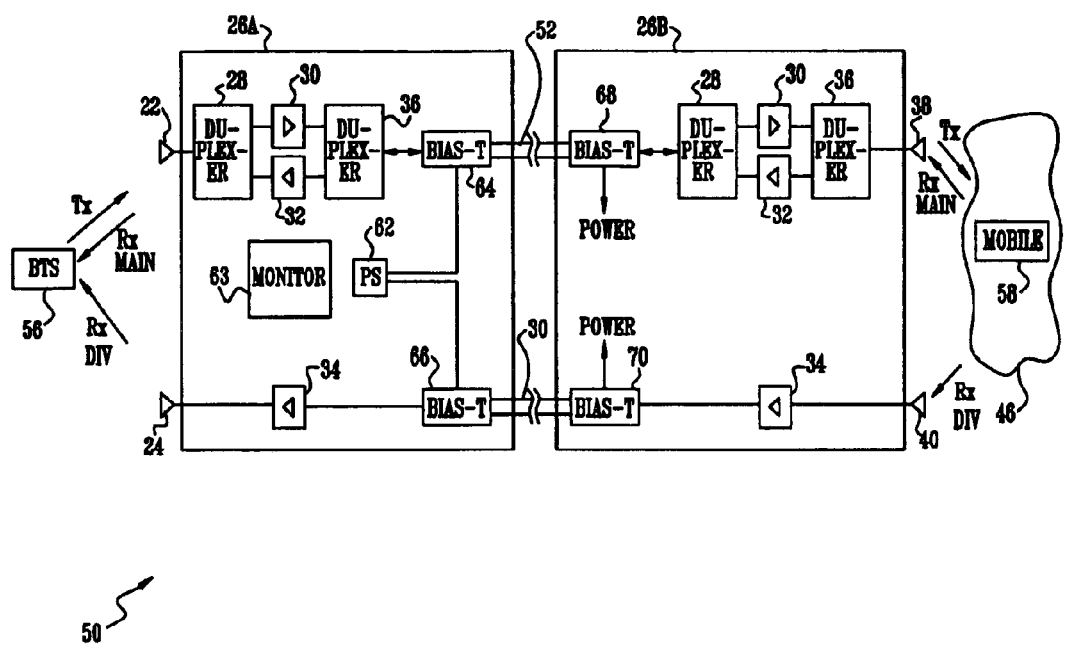
FIG. 3 is a schematic block diagram of a split main/diversity repeater system, according to a preferred embodiment of the present invention.

FIG. 3 is a schematic block diagram of a split main/diversity repeater system 50, according to a preferred embodiment of the present invention. System 50 comprises a first repeater 26A and a second repeater 26B. Apart from the differences described below, the operation of repeaters 26A and 26B is generally similar to that of repeater 26 (FIG. 2), so that elements indicated by the same reference numerals in repeaters 26, 26A, and 26B are generally identical in construction and in operation. In U.S. patent application Ser. No. 09/431,434, which is assigned to the assignee of the present disclosure and which is incorporated herein by reference, a detailed description is provided of separate repeaters generally similar in operation to repeaters 26A and 26B.

Repeater 26A receives Tx signals from a BTS 56, and transmits Rx-MAIN and Rx-DIV signals to the BTS, via antennas 22 and 24, or by another method, as described above with reference to repeater 26. Duplexer 36 of repeater 26A is coupled, preferably via a bias-T filter 64 and a bias-T filter 68, to duplexer 28 of repeater 26B by a cable 52. An output of amplification section 34 of repeater 26B is coupled, preferably via a bias-T filter 70 and a bias-T filter 66, to an input of amplification section 34 of repeater 26A by a cable 54. Preferably, cables 52 and 54 are coaxial cable capable of transferring signals between repeaters 26A and 26B without appreciable loss. Further preferably, any losses caused by the cables are compensated for by adjusting gains of at least some of the amplification sections, so that a system noise figure is substantially unaltered.

In some preferred embodiments of the present invention, repeater 26A comprises a power supply 62, which generates one or more power levels for operating components of the repeater. Preferably, power from power supply 62 is conveyed via bias-T filter 64 and/or bias-T filter 66 in repeater 26A to cables 52 and 54 respectively. The power is extracted from cables 52 and 54 by respective bias-T filters 68 and 70 in repeater 26B, and the extracted power is used to power components in repeater 26B. Preferably, repeater 26A comprises a monitoring unit 63, which receives monitoring signals from components of repeater 26A, and, via cable 52 and/or cable 54 from components of repeater 26B. The monitoring signals are generated and used by methods known in the art, for monitoring the condition of repeaters 26A and 26B.

Repeater 26B transmits the Tx signals received from cable 52 from its antenna 38, and the signals are received by a mobile transceiver 58 in a region 60. Mobile 58 transmits reverse signals which are received as Rx-MAIN and Rx-DIV signals respectively by antenna 38 and antenna 40 of repeater 26B. The Rx-MAIN signals are transmitted via cable 52 to repeater 26A, and from the repeater are conveyed to BTS 56, as described above for Rx-MAIN signals with reference to FIG. 2. The Rx-DIV signals are transmitted via cable 54 to repeater 26A, and are also conveyed to BTS 56, as described above for Rx-DIV signals with reference to FIG. 2.

As for repeater 26, repeater system 50 is most preferably utilized in situations where region 60 is substantially hidden from BTS 56. Since system 50 is a split system, it will be appreciated that the system has greater flexibility compared to repeater 26, since repeater 26A and repeater 26B may be positioned substantially independently of each other. Furthermore, region 60 only needs to be within range of, i.e., visible to, repeater 26B, and BTS 56 only needs to be within range of repeater 26A.

Figure 4:
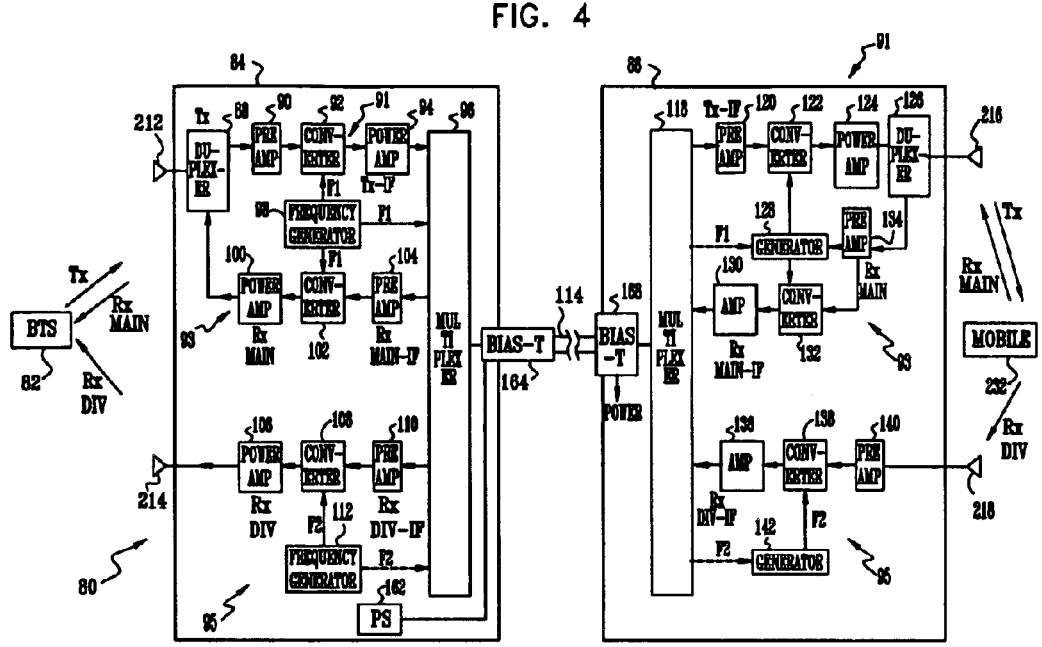
FIG. 4 is a schematic block diagram of an alternative split main/diversity repeater system, according to a preferred embodiment of the present invention.

FIG. 4 is a schematic block diagram of an alternative split main/diversity repeater system 80, according to a preferred embodiment of the present invention. System 80 comprises a first repeater 84 and a second repeater 86. Apart from the differences described below, the operation of repeater 86 is generally similar to that of repeater 84.

Repeater 84 comprises an antenna 212 which receives forward transmission signals Tx from a BTS 82, which signals follow a path 91 comprised in the two repeaters. The signals are transferred via a duplexer 88 to a pre-amplification section 90, and from there to a frequency converter section 92. In some preferred embodiments of the present invention, converter 92 comprises a mixer which receives a first local oscillator frequency F1 from a first frequency generator 98. An alternative system of frequency conversion is described hereinbelow. Converter 92 converts the Tx signals to an intermediate frequency Tx signal (Tx-IF) which is preferably significantly smaller than the frequency of Tx. For example, if Tx comprises frequencies centered at 1960 MHz, and F1 is set at 1780 MHz, Tx-IF is preferably the lower generated intermediate frequency of 180 MHz.

Tx-IF is amplified in a power amplifier section 94, and the amplified power output is transferred via a multiplexer 96, most preferably to a cable 114 which couples repeater 84 to repeater 86. Alternatively, cable 114 comprises two separate cables which transfer separate reverse main and diversity signals, generally as described above with reference to system 50. Optionally, frequency F1 or a reference clock defining F1 is also transferred via multiplexer 96 and cable 114 to repeater 86. Cable 114 connects to a multiplexer 118 in repeater 86, and Tx-IF is filtered from multiplexer 118 to a pre-amplification section 120, which generates an amplified Tx-IF signal for a converter 122, preferably comprising a mixer. If frequency F1 or a clock defining F1 has been transmitted to multiplexer 118, the multiplexer filters F1 or the clock from the signals received from cables 114. The recovered F1 signal is used as a reference for a frequency generator 128. Generator 128 most preferably comprises a phase sensitive detector, and generates a local oscillator signal having a frequency substantially the same as F1. Alternatively, if F1 is not received from repeater 84, frequency generator comprises means known in the art for generating a frequency substantially the same as F1.

Tx-IF and F1 are mixed in converter 122, and signal Tx is recovered from the output of the converter. The recovered Tx is amplified in an amplification section 124, and a filtered amplified output from section 124 is conveyed via a duplexer 126 to an antenna 216, which radiates the Tx signal to a mobile transceiver 232.

Mobile 232 transmits reverse signals, which are received as an Rx-MAIN signal at antenna 216, and as an Rx-DIV signal at an antenna 218 comprised in repeater 86.

In a reverse main signal path 93, the Rx-MAIN signal is conveyed via a pre-amplification section 134 to a converter 132, which also receives the local oscillator signal from generator 128, and which forms an intermediate signal Rx-MAIN-IF. Rx-MAIN-IF is amplified in an amplification section 130, and the amplified output is conveyed via multiplexer 118 and cable 114 to multiplexer 96 in repeater 84.

Multiplexer 96 filters Rx-MAIN-IF from the signals received from cable 114, and the filtered signal is transferred via an amplification section 104 to a converter 102, which preferably comprises a mixer, and which also receives frequency F1 from generator 98. Converter 102 recovers Rx-MAIN from its two input signals, and the recovered Rx-MAIN signal is filtered and amplified in an amplification section 100, and output as an amplified Rx-MAIN signal via duplexer 88 to antenna 212. Antenna 212 radiates Rx-MAIN to BTS 82.

In a reverse diversity signal path 95, the Rx-DIV signal from antenna 218 is filtered and amplified in a pre-amplification section 140, and the amplified signal is transferred to a converter 138. Converter 138 preferably comprises a mixer, and receives a local oscillator frequency F2, or a reference clock indicative of F2, from a frequency generator 142. F2 is preferably different from F1, so that an intermediate Rx-DIV-IF signal generated by converter 138 and output therefrom comprises a different frequency to that of signal Rx-MAIN-IF. It will be appreciated that if cable 114 comprises a cable conveying the Rx-MAIN-IF signal and a separate cable conveying the Rx-DIV-IF signal, the two signals do not need to be different in frequency, so that F1 does not need to differ from F2. When only one frequency is used, herein assumed to be F1, frequency generators 112 and 142 are not implemented, and their functions are replaced by generators 98 and 128 respectively.

The Rx-DIV-IF signal is filtered and amplified in an amplification section 136, and the amplified signal is transferred via multiplexer 118 and cable 114 to multiplexer 96. Multiplexer 96 filters the RX-DIV-IF signal from the signals received from cables 114, and transfers the RX-DIV-IF signal to a converter 108, which preferably comprises a mixer, and which also receives a local oscillator frequency F2 generated by generator 112. Optionally, F2 from generator 112 is also conveyed, for use as a reference by generator 142, via multiplexer 96, cable 114, and multiplexer 118, substantially as described hereinabove for frequency F1.

Converter 108 recovers the Rx-DIV signal from its two inputs, and the recovered signal is filtered and amplified in an amplification section 106. The amplified Rx-DIV signal is radiated from an antenna 214 to BTS 82, which thus receives the Rx-DIV and Rx-MAIN signals as separate signals, and which recovers the information broadcast by mobile 232 from the two signals, by methods known in the art.

In some preferred embodiments of the present invention, repeater 84 comprises a power supply 162, which generates one or more power levels for operating components of the repeater. Preferably, power from power supply 162 is conveyed via a bias-T filter 164 in repeater 84 to cable 114. The power is extracted from cable 114 by a bias-T filter 168 in repeater 86, and the extracted power is used to power components in repeater 86.

It will be understood that, as described above for BTS 44 with reference to FIG. 2, BTS 82 may be coupled to repeater 84 by one or more cables which are capable of conveying the Tx, Rx-MAIN and Rx-DIV signals between the BTS and the repeater, or by other methods known in the art. All such methods are assumed to be comprised within the scope of the present invention.

It will be appreciated that the intermediate frequencies used in system 80 may be chosen to substantially reduce losses in cable 114, compared to cases such as described with reference to FIG. 3.

In alternative preferred embodiments of the present invention, at least some of the signals transferred between repeater 84 and repeater 86 are in the form of optical radiation, and cable 114 comprises a fiber optic cable. For example, in path 91 frequency generator 98 and converter 92 comprise an optical emitter such as a light emitting diode (LED) or solid state laser, producing radiation having a frequency F1, typically of the order of 200 THz, corresponding to a wavelength of the order of 1500 nm. The optical radiation is modulated by signal Tx, producing a modulated optical signal Tx-IF. Correspondingly, amplification sections 94 and 120 comprise respective optical amplifiers, multiplexers 96 and 118 comprise optical multiplexers such as circulators, and converter 102 comprises an optical detector such as a photo-diode.

Those skilled in the art will be able to apply the above description for optical elements in path 91, mutatis mutandis, to elements in paths 93 and 95, so that converter 132 and converter 138 and their associated frequency generators correspond respectively to a first and a second optical emitter. Similarly, converter 102 and converter 108 correspond respectively to a first and a second optical detector. It will be understood that cable 114 may comprise more than one fiber optic cable, in which case, as described above for signals being transferred via non-optical radiation, only one optical emitter needs to be implemented.

It will be appreciated that the preferred embodiments described herein utilize a forward transmission signal and a reverse main signal following a first path, and a reverse diversity signal following a second path. Those skilled in the art will be able to adapt the descriptions herein to situations wherein a second forward transmission signal follows the second path. All such adaptations are included in the scope of the present invention.

Figure 5:
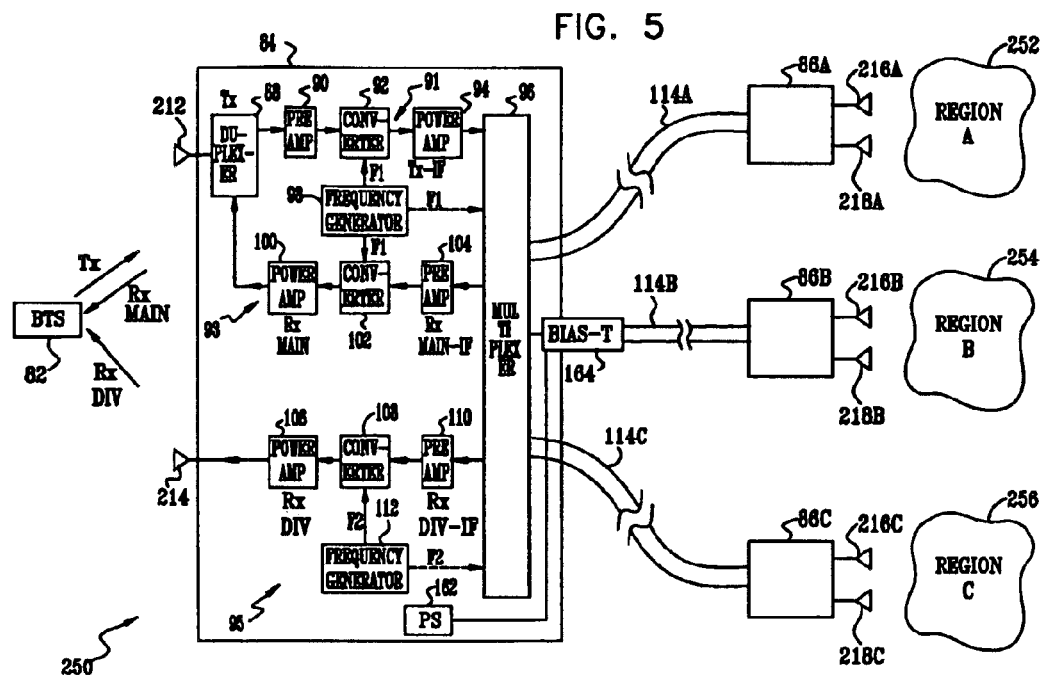
FIG. 5 is a schematic block diagram of another alternative split main/diversity repeater system, according to a preferred embodiment of the present invention.

FIG. 5 is a schematic block diagram of another alternative split main/diversity repeater system 250, according to a preferred embodiment of the present invention. System 250 comprises a first repeater 84A and a plurality of second repeaters 86A, 86B, 86C. Apart from the differences described below, the operation of repeater 84A is generally similar to that of repeater 84 (FIG. 4), so that elements indicated by the same reference numerals in repeaters 84 and 84A are generally identical in construction and in operation. Similarly, the operation of repeaters 86A, 86B, and 86C is generally similar to that of repeater 86.

Repeater 86A is coupled to antennas 216A and 218A, repeater 86B is coupled to antennas 216B and 218B, and repeater 86C is coupled to antennas 216C and 218C. Antennas 216A, 216B, and 216C communicate with respective regions 252, 254, and 256, herein termed region A, B, and C respectively, and perform substantially the same functions as antenna 216, by transmitting Tx signals to their respective regions, and receiving Rx-Main signals therefrom. Similarly antennas 218A, 218B, and 218C perform substantially the same functions as antenna 218, by receiving Rx-diversity signals from their respective regions.

Repeaters 86A, 86B, and 86C are respectively coupled to multiplexer 96 in repeater 84 by cabling 114A, 114B, and 114C, each of which cabling is generally similar in implementation to cable 114 described above. Optionally, the coupling is via a bias-T filter such as bias-T 164. Multiplexer 96 transmits the Tx signals, and other forward signals such as local oscillator signals and/or references thereto, substantially as described above with reference to FIG. 4. Rx-Main and Rx-Diversity signals from each of regions A, B, and C are preferably multiplexed in multiplexer 96, by methods known in the art, before being conveyed to antennas 212 and 214 for transmission to BTS 82.

Most preferably, repeaters 86A, 86B, and 86C are positioned so that they respectively "cover" regions A, B, and C, which are hidden from direct transmission of BTS 82. Thus system 250 enables a mobile transceiver in these regions, which would normally not be able to function therein, to be effectively in direct communication with BTS 82.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A radio-frequency (RF) repeater system, comprising:
   a first repeater unit, which is adapted to receive and amplify forward-signals from a first transceiver so as to generate amplified-forward-signals;
   cabling, which is adapted to receive and convey the amplified-forward-signals from the first repeater unit; and
   a second repeater unit, which is adapted to receive the amplified-forward-signals from the cabling and to further amplify the amplified-forward-signals so as to generate resultant-forward-signals and to radiate the resultant-forward-signals to a second transceiver, and which is adapted to receive and amplify reverse-main-signals and reverse-diversity-signals from the second transceiver so as to generate respectively amplified-reverse-main-signals and amplified-reverse-diversity-signals and to convey the amplified-reverse-main-signals and the amplified-reverse-diversity-signals to the first repeater unit via the cabling, and wherein the first repeater unit is adapted to further amplify the amplified-reverse-main-signals and amplified-reverse-diversity-signals so as to generate respective resultant-reverse-main-signals and resultant-reverse-diversity-signals and to transmit the resultant-reverse-main-signals and the resultant-reverse-diversity-signals to the first transceiver.

2. A repeater according to claim 1, wherein the forward-signals are not received by the second transceiver, and the reverse-main-signals and the reverse-diversity-signals are not received by the first transceiver.

3. A repeater according to claim 1, wherein the reverse-main-signals and the reverse-diversity-signals are generated from a reverse-signal transmitted from the second transceiver.

4. A repeater according to claim 1, wherein the second repeater unit comprises a first antenna which receives the reverse-main-signals and a second antenna which receives the reverse-diversity-signals.

5. A repeater according to claim 4, wherein the first and second antennas are separated by a distance within a range of 1–6 wavelengths of the reverse-main-signals and the reverse-diversity-signals.

6. A repeater according to claim 4, wherein the first and second antennas are adapted to receive differently polarized signals.

7. A repeater according to claim 1, wherein at least one of the first and the second repeater units is adapted to introduce a time differential between the reverse-main-signals and the reverse-diversity-signals.

8. A repeater according to claim 1, wherein the cabling comprises a first cable which conveys the amplified-forward-signals and the amplified-reverse-main-signals, and a second cable which conveys the amplified-reverse-diversity-signals.

9. A repeater according to claim 1, wherein the first repeater unit comprises a power supply which supplies power to the first repeater unit and to the second repeater unit via the cabling.

10. A repeater according to claim 1, wherein the first repeater unit comprises a monitor which monitors a condition of the first repeater unit and of the second repeater unit via the cabling.

11. A repeater according to claim 1, wherein the first repeater unit comprises a first forward-signal-converter adapted to generate the amplified-forward-signals as converted-frequency-forward-signals, and the second repeater unit comprises a second forward-signal-converter adapted to generate the resultant-forward-signals from the converted-frequency-forward-signals.

12. A repeater according to claim 11, wherein the first forward-signal-converter comprises a first mixer which receives an indication of a local oscillator (LO) frequency and generates the converted-frequency-forward-signals as intermediate-frequency-forward-signals (IF-forward-signals) having a frequency less than the forward-signals responsive to the indication, and wherein the second forward-signal-converter comprises a second mixer which receives the indication of the LO frequency and the IF-forward-signals and generates the resultant-forward-signals responsive thereto.

13. A repeater according to claim 11, wherein the first forward-signal-converter comprises an optical emitter which generates a modulated-optical-carrier responsive to the forward-signals, the second forward-signal-converter comprises an optical detector which receives the modulated-optical-carrier and generates the resultant-forward-signals therefrom, and wherein the cabling comprises a fiber optic cable.

14. A repeater according to claim 1, wherein the second repeater unit comprises:
   a first reverse-signal-converter adapted to generate the amplified-reverse-main-signals as converted-frequency-reverse-main-signals; and
   a second reverse-signal-converter adapted to generate the amplified-reverse-diversity-signals as converted-frequency-reverse-diversity-signals,
   and wherein the first repeater unit comprises:
   a third reverse-signal-converter adapted to generate the resultant-reverse-main-signals from the converted-frequency-reverse-main-signals; and
   a fourth reverse-signal-converter adapted to generate the resultant-reverse-diversity-signals from the converted-frequency-reverse-diversity-signals.

15. A repeater according to claim 14, wherein the converted-frequency-reverse-diversity-signals comprise a different frequency from the converted-frequency-reverse-main-signals.

16. A repeater according to claim 14, wherein the first reverse-signal-converter comprises a first mixer which receives an indication of a first local oscillator (LO) frequency and generates the converted-frequency-reverse-main-signals as intermediate-frequency-reverse-main-signals (IF-reverse-main-signals) having a frequency less than the reverse-main-signals responsive thereto, and wherein the third reverse-signal-converter comprises a second mixer which receives the indication of the first LO frequency and the IF-reverse-main-signals and generates the resultant-reverse-main-signals responsive thereto.

17. A repeater according to claim 16, wherein the second reverse-signal-converter comprises a third mixer which receives an indication of a second LO frequency and generates the converted-frequency-reverse-diversity-signals as intermediate-frequency-reverse-diversity-signals (IF-reverse-diversity-signals) having a frequency less than the reverse-diversity-signals responsive thereto, and wherein the fourth reverse-signal-converter comprises a fourth mixer which receives the indication of the second LO frequency and the IF-reverse-diversity-signals and generates the resultant-reverse-diversity-signals responsive thereto.

18. A repeater according to claim 17, wherein the second LO frequency and the first LO frequency are different.

19. A repeater according to claim 14, wherein the first reverse-signal-converter comprises a first optical emitter which generates a first modulated-optical-carrier responsive to the reverse-main-signals, and wherein the third reverse-signal-converter comprises a first optical detector which receives the first modulated-optical-carrier and generates the resultant-reverse-main-signals therefrom, and wherein the cabling comprises a fiber optic cable.

20. A repeater according to claim 19, wherein the second reverse-signal-converter comprises a second optical emitter which generates a second modulated-optical-carrier responsive to the reverse-diversity-signals, and wherein the fourth reverse-signal-converter comprises a second optical detector which receives the second modulated-optical-carrier and generates the resultant-reverse-diversity-signals therefrom.

21. A repeater according to claim 20, wherein the second modulated-optical-carrier comprises a second modulated-optical-carrier frequency different in value from a first modulated-optical-carrier frequency of the first modulated-optical-carrier.

22. A method for repeating radio-frequency (RF) signals, comprising:
   receiving forward-signals from a first transceiver;
   amplifying the forward-signals in a first repeater unit so as to generate amplified-forward-signals;
   conveying the amplified-forward-signals to a second repeater unit;
   further amplifying the amplified-forward-signals in the second repeater unit so as to generate resultant-forward-signals;
   radiating the resultant-forward-signals to a second transceiver;
   receiving reverse-main-signals and reverse-diversity-signals from the second transceiver;
   amplifying the reverse-main-signals and the reverse-diversity-signals in the second repeater unit so as to generate respectively amplified-reverse-main-signals and amplified-reverse-diversity-signals;
   conveying the amplified-reverse-main-signals and the amplified-reverse-diversity-signals to the first repeater unit;
   further amplifying the amplified-reverse-main-signals and amplified-reverse-diversity-signals in the first repeater unit so as to generate respectively resultant-reverse-main-signals and resultant-reverse-diversity-signals; and
   transmitting the resultant-reverse-main-signals and the resultant-reverse-diversity-signals to the first transceiver.

23. A method according to claim 22, wherein conveying the amplified-forward-signals comprises conveying the amplified-forward-signals via cabling.

24. A method according to claim 22, wherein the forward-signals are not received by the second transceiver, and the reverse-main-signals and the reverse-diversity-signals are not received by the first transceiver.

25. A method according to claim 22, wherein receiving the reverse-main-signals and the reverse-diversity-signals from the second transceiver comprises transmitting a reverse-signal from the second transceiver and generating the reverse-main-signals and the reverse-diversity-signals responsive to the reverse-signal.

26. A method according to claim 22, wherein receiving the reverse-main-signals and the reverse-diversity-signals comprises receiving the reverse-main-signals in a first antenna and receiving the reverse-diversity-signals in a second antenna.

27. A method according to claim 26, wherein the first and second antennas are separated by a distance within a range of 1–6 wavelengths of the reverse-main-signals and the reverse-diversity-signals.

28. A method according to claim 26, wherein the first and second antennas are adapted to receive differently polarized signals.

29. A method according to claim 22, and comprising introducing a time delay between the reverse-main-signals and the reverse-diversity-signals.

30. A method according to claim 22, wherein conveying the amplified-forward-signals comprises conveying the amplified-forward-signals via a first cable, and wherein receiving the reverse-main-signals and the reverse-diversity-signals comprises conveying the reverse-main-signals via the first cable and conveying the reverse-diversity-signals via a second cable.

31. A method according to claim 22, wherein amplifying the forward-signals comprises converting a frequency of the forward-signals to generate the amplified-forward-signals as converted-frequency-forward-signals, and wherein further amplifying the amplified-forward-signals comprises generating the resultant-forward-signals from the converted-frequency-forward-signals.

32. A method according to claim 31, wherein converting the frequency of the forward-signals comprises mixing the forward-signals in a first mixer with a local oscillator (LO) frequency and generating the converted-frequency-forward-signals as intermediate-frequency-forward-signals (IF-forward-signals) having a frequency less than the forward-signals, and wherein further amplifying the amplified-forward-signals comprises mixing the IF-forward-signals with the LO frequency and the IF-forward-signals in a second mixer and generating the resultant-forward-signals therefrom.

33. A method according to claim 31, wherein converting the frequency of the forward-signals comprises modulating an optical carrier to generate a modulated-optical-carrier responsive to the forward-signals, and conveying the modulated-optical-carrier from the first repeater unit to the second repeater unit via a fiber optic cable, and generating the resultant-forward-signals comprises detecting the modulated-optical-carrier.

34. A method according to claim 22, and comprising:
generating in a first reverse-signal-converter comprised in the second repeater unit the amplified-reverse-main-signals as converted-frequency-reverse-main-signals;
generating in a second reverse-signal-converter comprised in the second repeater unit the amplified-reverse-diversity-signals as converted-frequency-reverse-diversity-signals;
generating in a third reverse-signal-converter comprised in the first repeater unit the resultant-reverse-main-signals from the converted-frequency-reverse-main-signals; and
generating in a fourth reverse-signal-converter comprised in the first repeater unit the resultant-reverse-diversity-signals from the converted-frequency-reverse-diversity-signals.

35. A method according to claim 34, wherein the converted-frequency-reverse-diversity-signals comprise a different frequency from the converted-frequency-reverse-main-signals.

36. A method according to claim 34, wherein generating in the first reverse-signal-converter comprises mixing a first local oscillator (LO) frequency with the reverse-main-signals so as to generate the converted-frequency-reverse-main-signals as intermediate-frequency-reverse-main-signals (IF-reverse-main-signals) having a frequency less than the reverse-main-signals, and generating in the third reverse-signal-converter comprises mixing the first LO frequency and the IF-reverse-main-signals so as to generate the resultant-reverse-main-signals therefrom.

37. A method according to claim 36, wherein generating in the second reverse-signal-converter comprises mixing a second LO frequency different from the first LO frequency with the reverse-diversity-signals so as to generate the converted-frequency-reverse-diversity-signals as intermediate-frequency-reverse-diversity-signals (IF-reverse-diversity-signals) having a frequency less than the reverse-diversity-signals, and wherein generating in the fourth reverse-signal-converter comprises mixing the second LO frequency and the IF-reverse-diversity-signals so as to generate the resultant-reverse-diversity-signals therefrom.

38. A method according to claim 34, wherein generating in the first reverse-signal-converter comprises modulating a first optical emitter with the reverse-main-signals so as to produce a first modulated-optical-carrier and conveying the first modulated-optical-carrier from the second repeater unit to the first repeater unit via a fiber optic cable, and wherein generating in the third reverse-signal-converter comprises detecting the first modulated-optical-carrier and generating the resultant-reverse-main-signals therefrom.

39. A method according to claim 38, wherein generating in the second reverse-signal-converter comprises modulating a second optical emitter with the reverse-diversity-signals so as to produce a second modulated-optical-carrier, and conveying the first modulated-optical-carrier from the second repeater unit to the first repeater unit via the fiber optic cable, and wherein generating in the fourth reverse-signal-converter comprises detecting in a second optical detector the second modulated-optical-carrier and generating the resultant-reverse-diversity-signals therefrom.

40. A radio-frequency (RF) repeater system, comprising:
a first repeater unit, which is adapted to receive and amplify forward-signals from a first transceiver so as to generate amplified-forward-signals;
cabling, which is adapted to receive and convey the amplified-forward-signals from the first repeater unit; and
a plurality of second repeater units, each of which is adapted to receive the amplified-forward-signals from the cabling and to further amplify the amplified-forward-signals so as to generate resultant-forward-signals and to radiate the resultant-forward-signals to a second transceiver, and which is adapted to receive and amplify reverse-main-signals and reverse-diversity-signals from the second transceiver so as to generate respectively amplified-reverse-main-signals and amplified-reverse-diversity-signals and to convey the amplified-reverse-main-signals and the amplified-reverse-diversity-signals to the first repeater unit via the cabling, and wherein the first repeater unit is adapted to further amplify the amplified-reverse-main-signals and amplified-reverse-diversity-signals so as to generate respective resultant-reverse-main-signals and resultant-reverse-diversity-signals and to transmit the resultant-reverse-main-signals and the resultant-reverse-diversity-signals to the first transceiver.

41. A method for repeating radio-frequency (RF) signals, comprising:
receiving forward-signals from a first transceiver;
amplifying the forward-signals in a first repeater unit so as to generate amplified-forward-signals;
conveying the amplified-forward-signals to a plurality of second repeater units;
further amplifying the amplified-forward-signals in the plurality of second repeater units so as to generate resultant-forward-signals;
radiating the resultant-forward-signals to a second transceiver;
receiving reverse-main-signals and reverse-diversity-signals from the second transceiver;

amplifying the reverse-main-signals and the reverse-diversity-signals in the plurality of second repeater units so as to generate respectively amplified-reverse-main-signals and amplified-reverse-diversity-signals;

conveying the amplified-reverse-main-signals and the amplified-reverse-diversity-signals to the first repeater unit;

further amplifying the amplified-reverse-main-signals and amplified-reverse-diversity-signals in the first repeater unit so as to generate respectively resultant-reverse-main-signals and resultant-reverse-diversity-signals; and transmitting the resultant-reverse-main-signals and the resultant-reverse-diversity-signals to the first transceiver.

42. A method according to claim 41, wherein conveying the amplified-forward-signals comprises conveying the amplified-forward-signals via cabling.

* * * * *